United States Patent

Oyama et al.

[11] Patent Number: 5,834,733
[45] Date of Patent: Nov. 10, 1998

[54] ARC WELDING MACHINE

[75] Inventors: Hidetoshi Oyama, Toyonaka; Toshinori Hongu, Nishinomiya; Koji Hamamoto, Himeji; Junzo Tanimoto, Marugame, all of Japan

[73] Assignee: Matsushita Electric Industrial Co., Ltd., Japan

[21] Appl. No.: 787,377

[22] Filed: Jan. 22, 1997

[30] Foreign Application Priority Data

Jan. 22, 1996 [JP] Japan ................................. 8-008115

[51] Int. Cl.$^6$ ...................................................... B23K 9/12
[52] U.S. Cl. ...................................................... 219/137.71
[58] Field of Search ........................ 219/137.71; 388/811, 388/819, 829, 831, 832

[56] References Cited

U.S. PATENT DOCUMENTS

| | | | |
|---|---|---|---|
| 3,617,845 | 11/1971 | McKenna | 388/829 |
| 4,584,458 | 4/1986 | Tremblay et al. | 219/137.71 |
| 5,526,460 | 6/1996 | DeFrancesco et al. | 388/831 |

*Primary Examiner*—Clifford C. Shaw
*Attorney, Agent, or Firm*—Parkhurst & Wendel

[57] ABSTRACT

An arc welding machine which is capable of feeding a welding wire stably at low and a high speeds. The arc welding machine includes a welding wire feed rate setting section; a welding wire feed motor; a welding wire feed motor driving section which supplies electric power required for driving said welding wire feed motor; and a welding wire feed control section which uses, as a control frequency, a frequency other than a frequency of an input power supply or a frequency twice as high or three times as high, or a wire feed control section which selects a low control frequency for feeding a welding wire at a low rate and a high frequency for feeding the welding wire at a high rate, or a welding wire feed control section which selects a high control frequency for feeding the welding wire at a low rate and a low frequency for feeding the welding wire at a high rate.

6 Claims, 7 Drawing Sheets

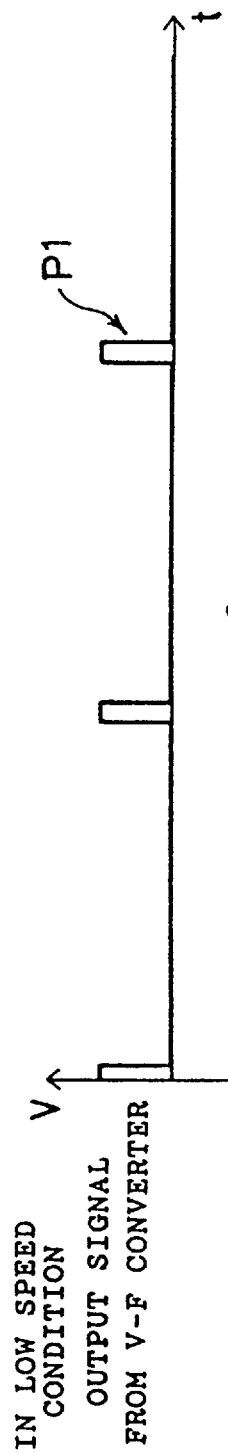
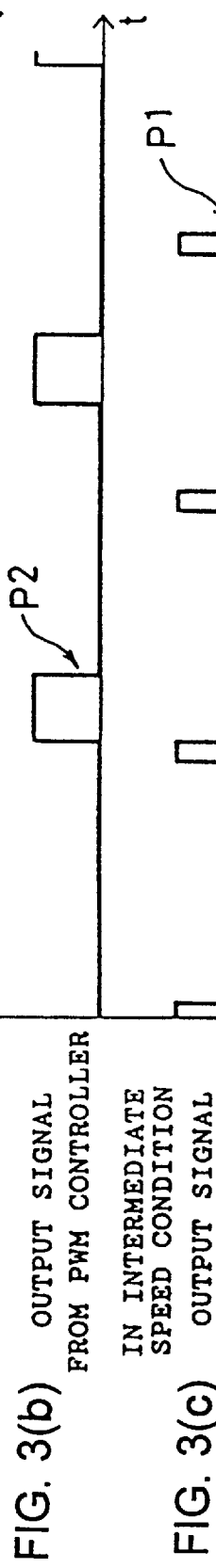
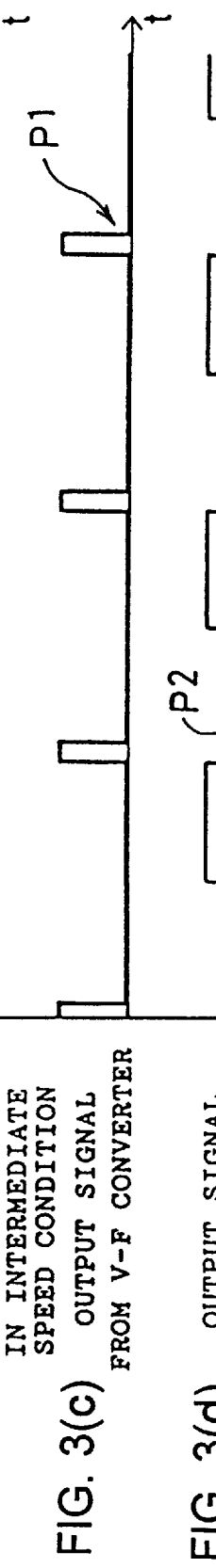
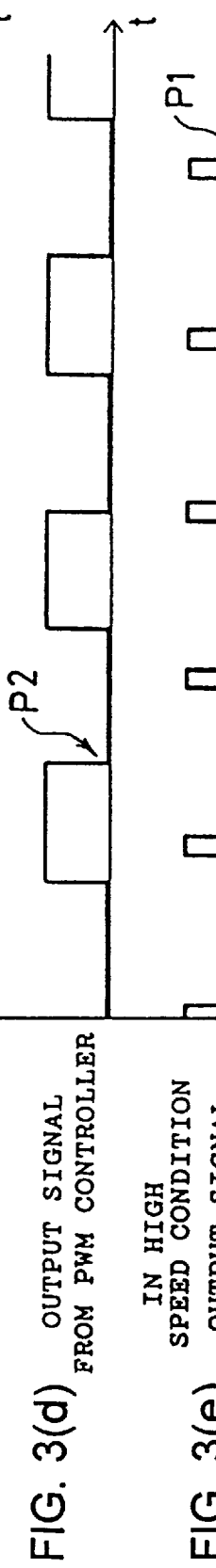
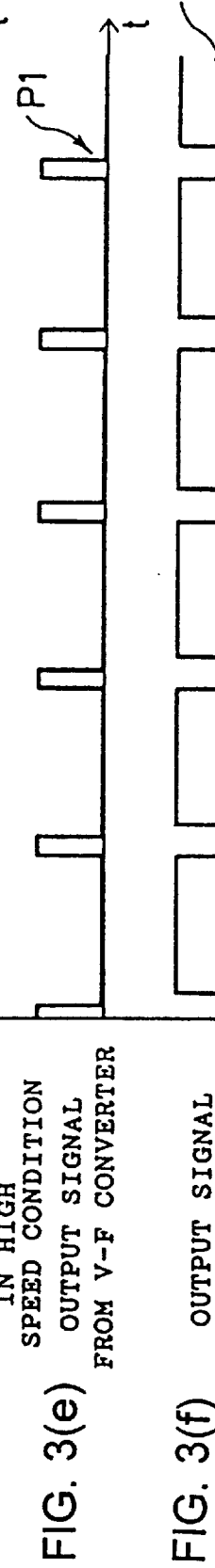
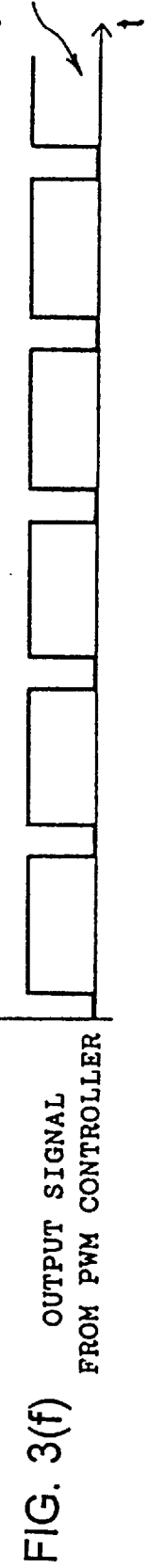
FIG. 3(a) OUTPUT SIGNAL FROM V-F CONVERTER IN LOW SPEED CONDITION
FIG. 3(b) OUTPUT SIGNAL FROM PWM CONTROLLER
FIG. 3(c) OUTPUT SIGNAL FROM V-F CONVERTER IN INTERMEDIATE SPEED CONDITION
FIG. 3(d) OUTPUT SIGNAL FROM PWM CONTROLLER
FIG. 3(e) OUTPUT SIGNAL FROM V-F CONVERTER IN HIGH SPEED CONDITION
FIG. 3(f) OUTPUT SIGNAL FROM PWM CONTROLLER

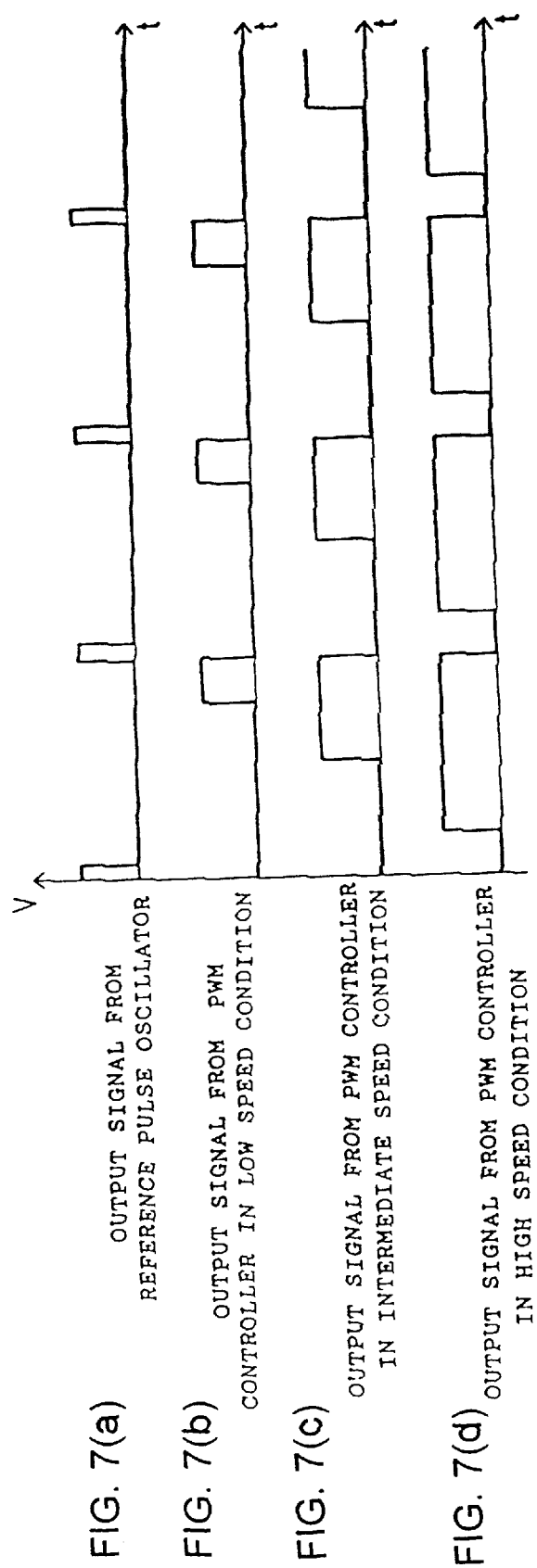

ARC WELDING MACHINE

FIELD OF THE INVENTION

The present invention relates to an arc welding machine for carrying out welding while feeding a consumable electrode (herein after referred to as a welding wire) by means of a welding wire feed motor, and producing an arc between the welding wire and a base metal, and a driving method for the welding wire feed motor.

BACKGROUND OF THE INVENTION

Typically, an arc welding machine uses a DC motor as a motor for feeding a welding wire and the motor is driven in the PWM control mode wherein a control frequency is selected at a frequency of an input AC power supply for the welding machine (50 Hz or 60 Hz in Japan) or a frequency twice as high or three times as high.

A conventional arc welding machine is shown in FIG. 6.

A reference numeral 1 represents a welding wire feed rate setting section, a reference numeral 2 designates a PWM controller, a reference numeral 3 denotes a welding wire feed motor driving section, a reference numeral 4 represents a welding wire feed motor, a reference numeral 5 designates a welding wire, a reference numeral 6 denotes a reference pulse oscillator and a reference numeral 7 represents an AC power supply.

The welding wire feed rate setting section 1 is set, for example, with a variable resistor according to an article to be welded by a welder so that it outputs analog signals having a small value for feeding the welding wire at a low rate and analog signals having a large value for feeding the welding wire at a high rate.

The reference pulse oscillator 6 outputs through the input AC power supply 7 for the welding machine repetitive pulse signals a (see (a) in FIG. 7) having a frequency of an input AC current or a frequency twice as high or three times as high.

The PWM controller 2 outputs repetitive pulse signals b having a pulse width which is narrowed as shown in (b) of FIG. 7 for feeding the welding wire at a low rate and broadened as shown in (d) of FIG. 7 for feeding the welding wire at a high rate while inputting the pulse signals a output from the reference pulse oscillator 6 and output signals from the welding wire feed rate setting section 1, and using the frequency of the pulse signals a from the reference pulse oscillator 6 as a control frequency. In an intermediate speed condition where the welding wire is fed at an intermediate rate, the pulse width is varied broader than that in the low speed condition and narrower than that in the high speed condition as shown in (c) of FIG. 7.

Using the output signals from the PWM controller 2 as inputs, the welding wire feed motor driving section 3 supplies electric power to the welding wire feed motor 4 according to the widths of the pulse signal, thereby rotating the welding wire feed motor 4 for feeding the welding wire 5.

DISCLOSURE OF THE INVENTION

Since the conventional welding machine having the configuration described above uses the frequency of the input AC power supply (50 Hz or 60 Hz in Japan), the frequency twice as high or the frequency three times as high as a control frequency for driving of the welding wire feed motor, the welding machine poses problems that it is incapable of carrying out high-speed control at a frequency higher than said control frequency described above or feeding the welding wire 5 stably while the welding wire is fed at a low rate or the welding wire feed motor 4 rotates at a low rotating frequency, thereby allowing an arc to be unstable or extinguished.

A primary object of the present invention is to solve the conventional problem described above, or provide an arc welding machine and a driving method for the welding wire feed motor capable of feeding a welding wire stably even at low and high speeds.

The arc welding machine according to the present invention is characterized in that it comprises a welding wire feed motor, a welding wire feed rate setting section, a welding wire feed control section which uses a control frequency other than a frequency of the input AC power supply or a frequency twice as high or three times as high, and a welding wire feed motor driving section which supplies electric power to said welding wire feed motor according to output signals from said welding wire feed control section.

Further, the driving method for the welding wire feed motor of the arc welding machine according to the present invention is characterized in that it is configured to lower a drive control frequency for the welding wire feed motor for feeding the welding wire at a low rate and enhance the control frequency for feeding the welding wire at a high rate, and narrow a width of driving pulses for the welding wire feed motor at said drive control frequency for feeding the welding wire at the low rate and broaden the control frequency for feeding the welding wire at the high rate.

The arc welding machine according to the present invention is also characterized in that it comprises a welding wire feed motor, a welding wire feed rate setting section, a welding wire feed control section which lowers a control frequency for feeding a welding wire at a low rate and enhances the control frequency for feeding the welding wire at a high rate, and a welding wire feed motor driving section which supplies electric power to said welding wire feed motor according to output signals from said welding wire feed control section, The arc welding machine according to the present invention is also characterized in that said welding wire feed control section is composed of a V-F converter which outputs repetitive pulse signals having a low frequency for feeding the welding wire at the low rate and repetitive pulse signals having a high frequency for feeding the welding wire at the high rate, and a PWM controller which functions using output signals from said V-F converter as a control frequency to narrow a pulse width when said welding wire feed rate setting section provides low output signals and broaden the pulse width when said welding wire feed rate setting section provides high output signals.

Furthermore, the welding wire feed motor driving method for the arc welding machine according to the present invention is characterized in that it is configured to enhance the drive control frequency for the welding wire feed motor for feeding the welding wire at the low rate and lower the drive control frequency for feeding the welding wire at said high rate, and narrow the driving pulse width for the welding wire feed motor at said drive control frequency for feeding the welding wire at the low rate and broaden the driving pulse width for feeding the welding wire at the high rate.

The arc welding machine according to the present invention is also characterized in that it comprises a welding wire feed motor, a welding wire feed rate setting section, a welding wire feed control section which enhances a control frequency for feeding the welding wire at a low rate and lowers the control frequency for feeding the welding wire at a high rate, and a welding wire feed motor driving section which supplies electric power to said welding wire feed motor according to output signals from said welding wire feed control section.

The arc welding machine according to the present invention is also characterized in that the welding wire feed control section described above is composed of a V-F converter which outputs repetitive pulse signals having a high frequency for feeding the welding wire at the low rate and repetitive pulse signals having a low frequency for feeding the welding wire at the high rate, and a PWM controller which functions using output signals from said V-F converter to narrow the pulse width when said welding wire feed rate setting section provides low output signals and broaden the pulse width when said welding wire feed rate setting section provides high output signals.

BRIEF DESCRIPTION OF THE DRAWINGS

FIGS. 3(a)–(f) are timing charts illustrating output signals in the first embodiment;

FIGS. 7(a)–(d) are timing charts illustrating output signals in the conventional arc welding machine.

DESCRIPTION OF THE EMBODIMENTS

Now, embodiments of the present invention will be described with reference to FIGS. 1 through 5.

Figure 6:
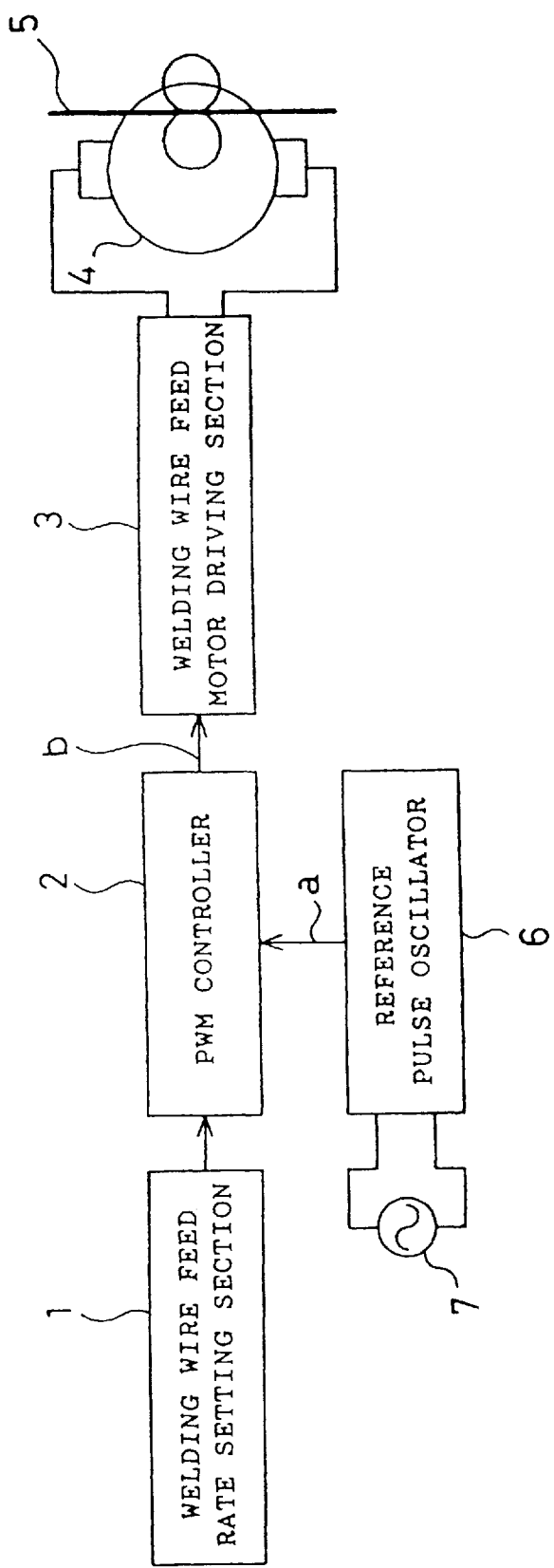
FIG. 6 is a block diagram illustrating a configuration of a conventional arc welding machine.

Members which functions similarly to those of the conventional arc welding machine shown in FIG. 6 will be described using the same reference numerals and symbols as those shown in FIG. 6.

(First embodiment)

Figure 1:
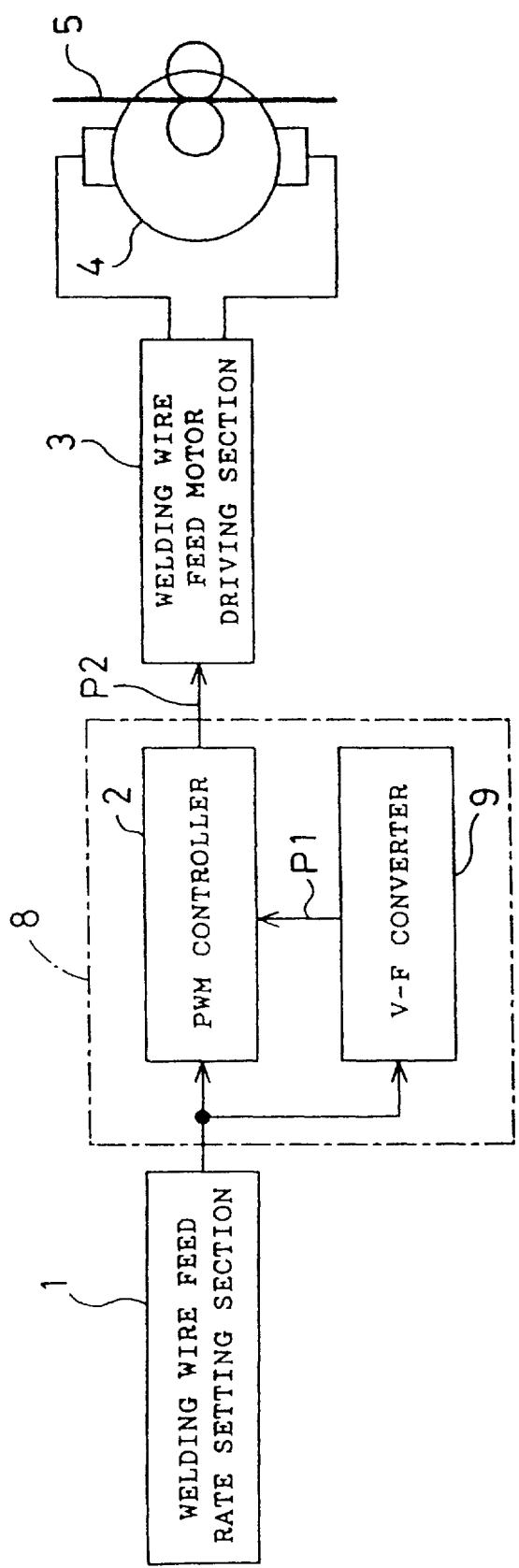
FIG. 1 is a block diagram illustrating a configuration of the first embodiment of the arc welding machine according to the present invention.
Figure 2:
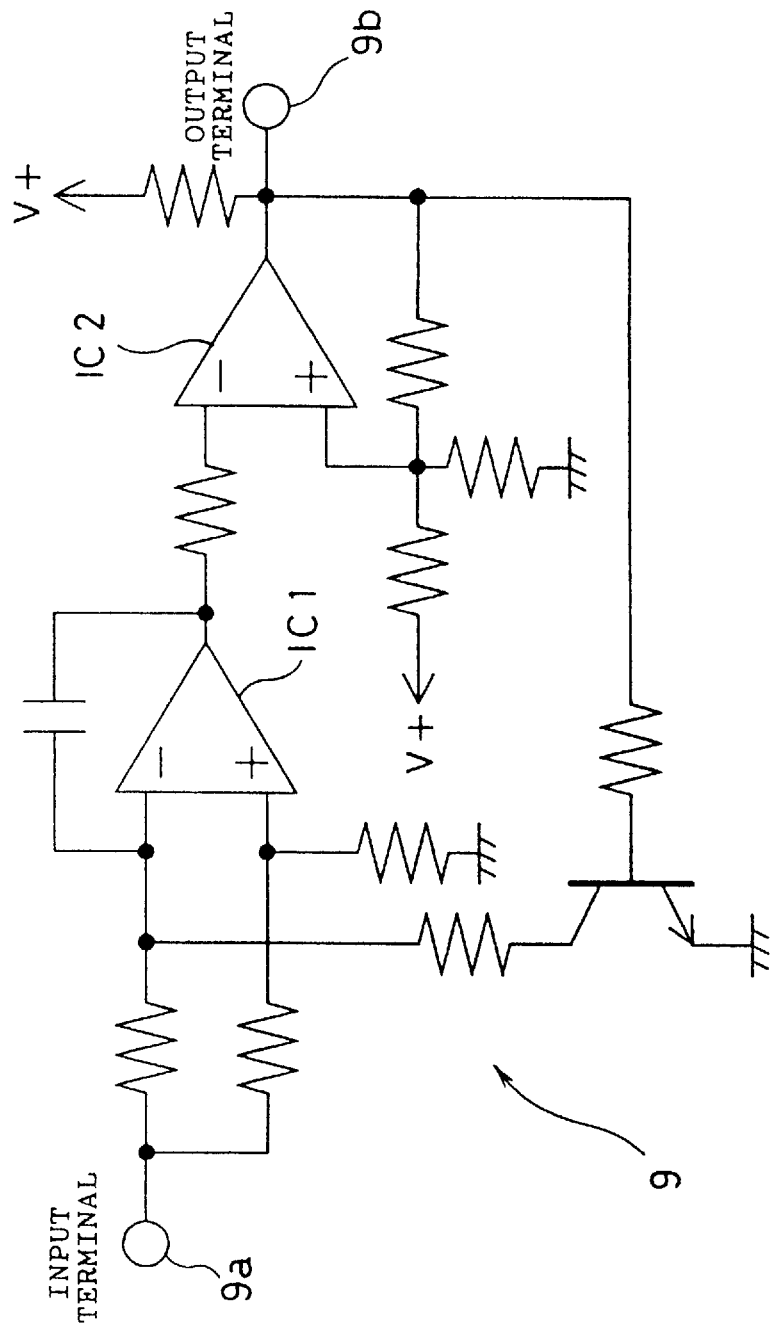
FIG. 2 is a circuit diagram illustrating a V-F converter used in the first embodiment.

The first embodiment of the present invention is illustrated in FIGS. 1 through 3.

In FIG. 1, a welding wire feed control section 8 is interposed between a welding wire feed rate setting section 1 and a welding wire feed motor driving section 3. The welding wire feed control section 8 is composed of a PWM controller 2 and a V-F converter 9. Concretely, the V-F converter 9 is composed of operation amplifiers IC1, IC2 and so on as shown in FIG. 2.

Reference numerals 9a represents an input terminal and a reference numeral 9b designates an output terminal.

The welding wire feed rate setting section 1 is set, for example, with a variable resistor according to an article to be welded by a welder and outputs analog signals having a small value for feeding a welding wire at a low rate or analog signals having a large value for feeding the welding wire at a high rate.

The V-F converter 9 outputs pulse oscillation signals P1 having a low frequency as shown in (a) of FIG. 3 when the welding wire feed rate setting section 1 outputs the analog signals having the small value, or in a low speed condition where the welding wire is fed at a low rate, or pulse oscillation signals P1 having a high frequency as shown in (e) of FIG. 3 when the welding wire feed rate setting section 1 outputs the analog signals having the large value, or in a high speed condition where the welding wire is fed at the high rate. In an intermediate speed condition where the welding wire is fed at an intermediate rate, the frequency is varied to a level higher than that in the low speed condition and lower than that in the high speed condition. Speaking concretely, the pulse oscillation signals P1 for the low speed condition of the welding wire is on the order of 10 Hz and the pulse oscillation signals P1 for the high speed condition of the welding wire is on the order of 1 kHz.

The PWM controller 2 provides output signals P2 shown in (b) of FIG. 3 in the low speed condition where the welding wire is fed at the low rate and provides output pulse signals P2 having a width broader than that in the low speed condition as shown in (f) of FIG. 3 in the high speed condition where the welding wire is fed at the high rate while using, as inputs, the output pulse oscillation signals P1 from the V-F converter 9 and output signals from the welding wire feed rate setting section 1, and the frequency of the pulse oscillation signals P1 as a reference control frequency. In an intermediate condition where the welding wire is fed at an intermediate rate, the PWM controller 2 provides output pulse signals P2 having a width which is broader than that in the low speed condition and narrower than that in the high speed condition.

The welding wire feed motor driving section 3 supplies electric power to the welding wire feed motor 4 according to the widths of the output pulse signals P2 from the PWM controller 2, thereby rotating the welding wire feed motor 4 for feeding the welding wire 5.

(Second embodiment)

Figure 4:
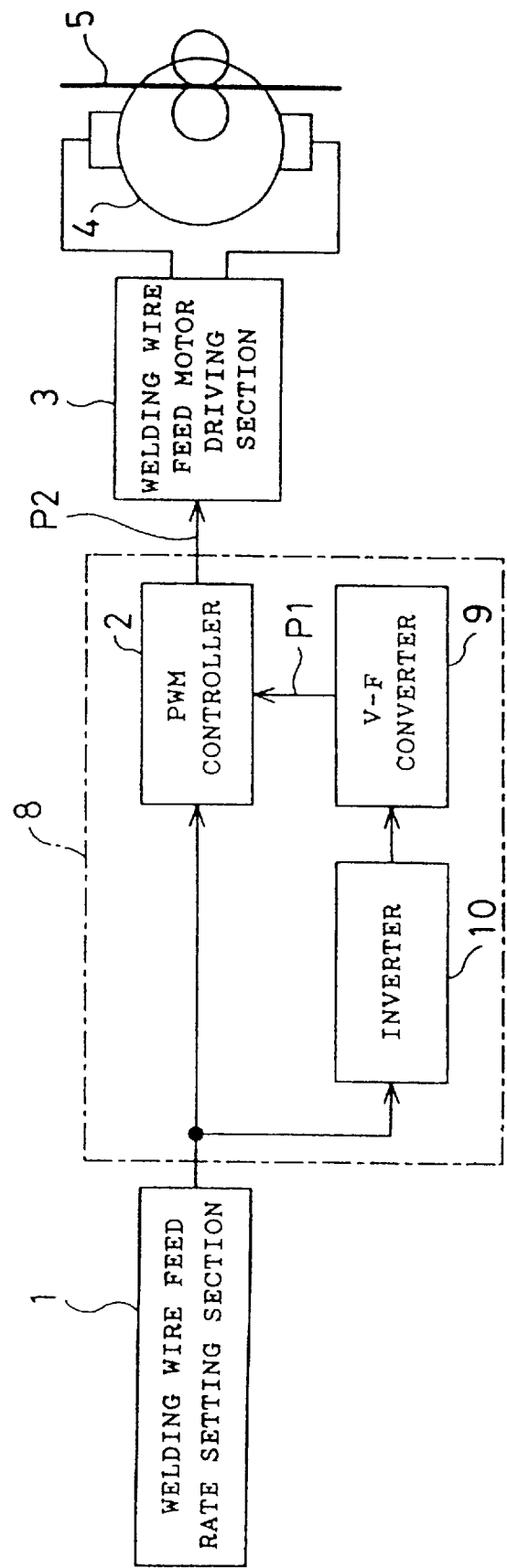
FIG. 4 is a block diagram illustrating a configuration of a second embodiment of the arc welding machine according to the present invention.
Figure 5:
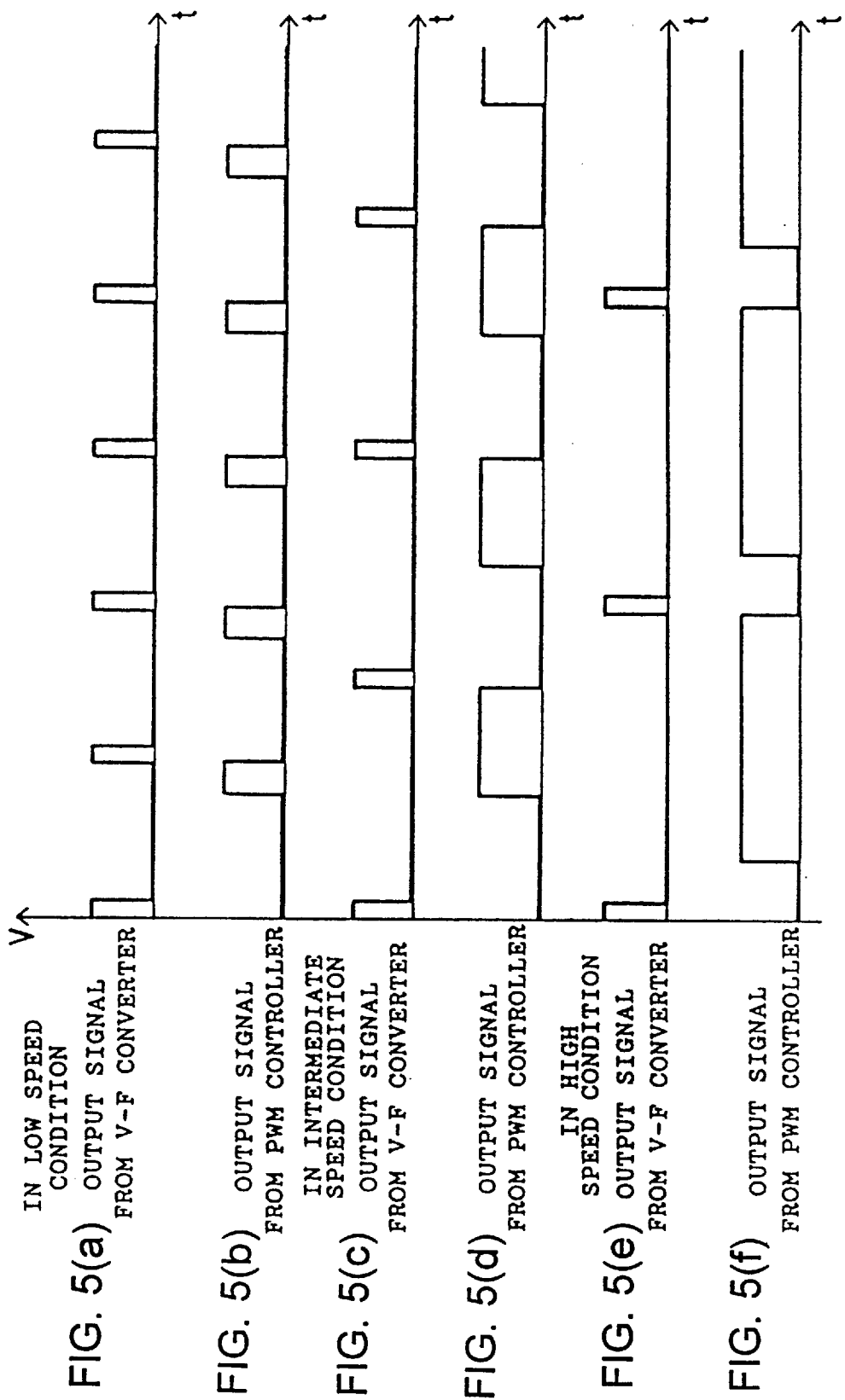
FIGS. 5(a)–(f) are timing charts illustrating output signals in the second embodiment.

The second embodiment of the present invention is illustrated in FIGS. 4 and 5.

FIG. 4 shows the second embodiment of the arc welding machine wherein an inverter 10 is added on an input side of the V-F converter 9 in the configuration of the first embodiment.

A welding wire feed rate setting section 1 is set, for example, with a variable resistor according to an article to be welded by a welder and outputs analog signals having a small value when a welding wire is fed at a low rate or analog signals having a large value when the welding wire is fed at a high rate.

The inverter 10 provides output signals which are varied in a direction opposite to the output signals from the welding wire feed rate setting section 1, or analog signals having a large value when the welding wire is fed at the low rate and analog signals having a small value when the welding wire is fed at the high rate.

A V-F converter 9 outputs, while using the output signals from the inverter 10 as inputs, pulse oscillation signals P1 having a high frequency as shown in (a) of FIG. 5 when the welding wire is fed at the low rate, or when the inverter 10 outputs the output signals having the large value or pulse oscillation signals P1 having a low frequency as shown in (e) of FIG. 5 when the welding wire is fed at the high rate, or in a high speed condition where the inverter 10 provides the low output signals. In an intermediate speed condition, the V-F converter 9 outputs pulse oscillation signals P1 shown in (c) of FIG. 5. Speaking concretely, the pulse oscillation signals P1 has a frequency on the order of 1 kHz in the low speed condition where the welding wire is fed at the low rate and a frequency on the order of 10 kHz in the high speed condition where the welding wire is fed at the high rate.

A PWM controller 2 provides output pulse signals P2 having a width which is narrowed as shown in (b) of FIG. 5 in a low speed condition where the welding wire is fed at the low rate while using, as inputs, the pulse oscillation signals P1 from the V-F converter 9 and the output signals from the welding wire feed rate setting section 1, and a frequency of the pulse oscillation signals P1 as a reference control frequency. In a high speed condition where the welding wire is fed at the high rate, the PWM controller 2 provides output pulse signals P2 having a width which is broadened as shown in (f) of FIG. 5.

In an intermediate speed condition, the PWM controller 2 provides output pulse signals P2 having a width which is broader than that in the low speed condition and narrower than that in the high speed condition as shown in (d) of FIG. 5.

The welding wire feed motor control section 3 supplies electric power to the welding wire feed motor 4 according to the widths of the output pulse signals P2, thereby rotating the welding wire feed motor 4 for feeding the welding wire 5.

Though the welding wire feed rate setting section 1 outputs the analog signals having the small value for feeding the welding wire at the low rate and the analog signals having the large value for feeding the welding wire at the high rate in the second embodiment described above, the same result can be obtained by configuring the welding wire feed rate setting section 1 so as to output analog signals having a large value for feeding the welding wire at the low rate and output the analog signals having a small value for feeding the welding wire at the high rate, and using the inputs to the V-F converter 9 as output signals from the welding wire feed rate setting section 1 and adopting the inputs to the PWM controller 2 as output signals from the inverter 10.

Though the welding wire feed rate setting section 1 outputs the analog signals having the small value for feeding the welding wire at the low rate and outputs the analog signals having the large value for feeding the welding wire at the high rate in the second embodiment, the same result can be obtained by configuring the outputs to the welding wire feed rate setting section 1 so as to output analog signals having a large value for feeding the welding wire at the low rate and analog signals having a small value for feeding the welding wire at the high rate, and using the inputs to the V-F converter 9 as output signals from the welding wire feed rate setting section 1, adopting the inputs to the PWM controller 2 as output signals from the welding wire feed rate setting section 1, using the outputs from the PWM controller 2 as inputs to the inverter 10 and adopting the outputs from the inverter 10 as the inputs to the welding wire feed motor control section 3.

Though the inputs to the V-F converter 9 are used as the output signals from the welding wire feed rate setting section 1 or the inverter 10 and the frequency of the output oscillation signals from the V-F converter 9 is variable in the first and second embodiments described above, the frequency of the output pulse signals from the V-F converter may be kept substantially constant by setting the inputs to the V-F converter 9 at a substantially constant value.

Though the inputs to the PWM controller 2 are used as the output signals from the welding wire feed rate setting section 1 and the width of the output pulse signals from the PWM controller 2 is variable in the first and second embodiments described above, the width of the output pulse signals from the PWM controller 2 may be kept substantially constant by setting the inputs to the PWM controller 2 at a substantially the same value.

As understood from the foregoing description, the present invention makes it possible to obtain an excellent arc welding machine which is capable of controlling rotation of a welding wire feed motor smoothly and speedily, thereby feeding a welding wire stably at low and high speeds by adopting a welding wire feed control section which uses, as a control frequency, a frequency which is other than a frequency of an input AC power supply or a frequency twice as high or three times as high, a welding wire feed control section which selects a low control frequency for feeding the welding wire at a low rate and a high control frequency for feeding the welding wire at a high rate or a welding wire control section which selects a high control frequency for feeding the welding wire at a low rate and a low control frequency for feeding the welding wire at a high rate.

We claim:

1. An arc welding machine of a consumable electrode type comprising: a welding wire feed motor, a welding wire feed motor driving section, a welding wire feed rate setting section, and a welding wire feed control section, said welding wire feed control section having:

a V-F converting section for determining a control frequency of a welding wire feed rate based on output signals from said welding wire feed rate setting section; and a PWM controller section connected to said V-F converting section for outputting a pulse signal for a welding wire feed rate.

2. An arc welding machine of a consumable electrode type according to claim 1, wherein the V-F converting section includes means for setting the control frequency to be proportional to the welding wire feed rate.

3. An arc welding machine of a consumable electrode type according to claim 1, wherein the V-F converting section includes means for setting the control frequency to be inversely proportional to the welding wire feed rate.

4. A driving method for welding wire feed motors of arc welding machines of a consumable electrode type comprising a welding wire feed motor, a welding wire feed motor driving section, a welding wire feed rate setting section, and a welding wire feed control section, said method comprising the steps of:

determining with a V-F converting section a control frequency of a welding wire feed rate based on output signals from said welding wire feed rate setting section; and outputting from a PWM controller section a pulse signal for a welding wire feed rate.

5. A driving method for welding wire feed motors of arc welding machines according to claim 4, wherein the control frequency is proportional to the welding wire feed rate.

6. A driving method for welding wire feed motors of arc welding machines according to claim 4, wherein the control frequency is inversely proportional to the welding wire feed rate.

* * * * *